United States Patent [19]
Williams et al.

[11] Patent Number: 5,863,070
[45] Date of Patent: Jan. 26, 1999

[54] INTEGRATED SUPERSTRUCTURE CHASSIS

[75] Inventors: Timothy R. Williams; Scott Glandon, both of Charlotte, Mich.

[73] Assignee: Spartan Motors, Inc., Charlotte, Mich.

[21] Appl. No.: 680,455

[22] Filed: Jul. 15, 1996

[51] Int. Cl.[6] .................................................. B62D 21/00
[52] U.S. Cl. ...................... 280/781; 280/789; 280/796; 296/164; 296/178; 296/204; 296/205
[58] Field of Search ..................... 280/781, 783, 280/785, 789, 790, 796; 296/178, 164, 179, 183, 203, 204, 205

[56] References Cited

U.S. PATENT DOCUMENTS

| | | | |
|---|---|---|---|
| 1,932,417 | 10/1933 | Marcum | 180/54 |
| 2,722,987 | 11/1955 | Dean | 180/64 |
| 3,989,119 | 11/1976 | Cady | 180/89 R |
| 4,415,051 | 11/1983 | Taylor | 180/65.1 |
| 5,403,063 | 4/1995 | Sjostedt | 296/187 |

*Primary Examiner*—Eric D. Culbreth
*Attorney, Agent, or Firm*—Knechtel, Demeur & Samlan

[57] ABSTRACT

An improved vehicle chassis for motor homes and busses is provided. According to the invention, the chassis has a front frame chassis subcomponent, a rear chassis subcomponent and a center floor rail system. Each subcomponent has contained within it the appropriate subcomponents associated with the chassis; the front subcomponent, for example, has a suspension unit and steering apparatus while the rear subcomponent has transmission, motor and suspension.

The front and rear frame chassis subcomponents have longitudinally extending frame rails which connect to one another via a plurality of longitudinally extending floor rails and perpendicular steel plates found in the center floor rail system.

The inventive device integrates the chassis and superstructure. Incorporating the superstructure into the chassis lowers vehicle height, and therefore, the center of gravity. This results in better handling and ride characteristics for the finished vehicle. Underbelly storage capacity of a particular vehicle is increased by approximately five inches without increasing vehicle height or lowering ground clearance.

10 Claims, 2 Drawing Sheets

INTEGRATED SUPERSTRUCTURE CHASSIS

I. TECHNICAL FIELD

The present invention relates to motor home and bus chassis, and more particularly, to a motor home and bus chassis having an integrated superstructure.

II. BACKGROUND OF INVENTION

The known construction of a motor home includes a chassis, a superstructure, and a body. The chassis houses the mechanical workings of the vehicle such as suspension, motor and drivetrain. The superstructure is affixed to the top of the chassis and provides the mounting base for the body. While this results in a solid and relatively safe vehicle, there are several shortcomings associated with this construction technique.

First, the resulting vehicle has a relatively high center of gravity. High center of gravity negatively affects vehicle handling and ride. Attempts have been made to lower the center of gravity; however, until now these attempts have resulted in a lowering of the ground clearance of the vehicle. This in turn diminishes the underbelly storage storage capabilities of the vehicle.

Another shortcoming of the present construction technique is that it is expensive and time consuming as it requires three manufacturing "processes": chassis, superstructure and body. A further shortcoming of the present construction technique is that by fitting the superstructure to the chassis, the wheel base is fixed, thereby decreasing body construction flexibility, absent costly customization.

Thus, there is need for an improved motor home and bus chassis which lowers the vehicle's center of gravity without decreasing underbelly storage space, improves the handling and ride of the vehicle, offers flexibility in sizing without costly customization, and is economical to produce.

III. OBJECTS OF THE INVENTION

An object of the present invention is to provide an improved vehicle chassis for motor homes and busses.

Another object of the present invention is to provide a vehicle chassis which incorporates the chassis and superstructure in one unit.

Another object of the present invention is to provide a vehicle chassis which decreases the vehicle center of gravity.

Another object of the present invention is to provide a vehicle chassis which results in a vehicle having improved handling and ride characteristics.

Another object of the present invention is to provide an improved vehicle chassis which does not lower ground clearance.

Another object of the present invention is to provide a vehicle chassis which provides flexible wheelbase selection.

Another object of the present invention is to provide a vehicle chassis which is economical to produce.

IV. SUMMARY OF THE INVENTION

The above objects are provided in an improved vehicle chassis for motor homes and busses. According to the invention, the chassis has a front chassis subcomponent, a rear chassis subcomponent, and a center floor rail system. Each subcomponent has contained within it the appropriate pieces associated with the chassis; the front subcomponent, for example, has a suspension unit and steering apparatus, and the rear subcomponent has transmission, motor and suspension.

The front and rear chassis subcomponents have longitudinally extending frame rails which affix to one another by attaching the longitudinally extending floor rails of the central floor rail system to the frame rails. The completed system integrates the superstructure into the chassis.

Use of the inventive device removes one step is from the manufacturing process in that the chassis and superstructure are of one piece.

Incorporation of the superstructure into the chassis lowers vehicle height, and therefore, the center of gravity. This results in better handling and ride characteristics for the finished vehicle. Also, use of the frame rail component system and floor rails increases the underbelly storage capacity of a particular vehicle by approximately five inches.

V. BRIEF DESCRIPTION OF THE DRAWINGS

VI. DESCRIPTION OF THE PREFERRED EMBODIMENT

Figure 1:
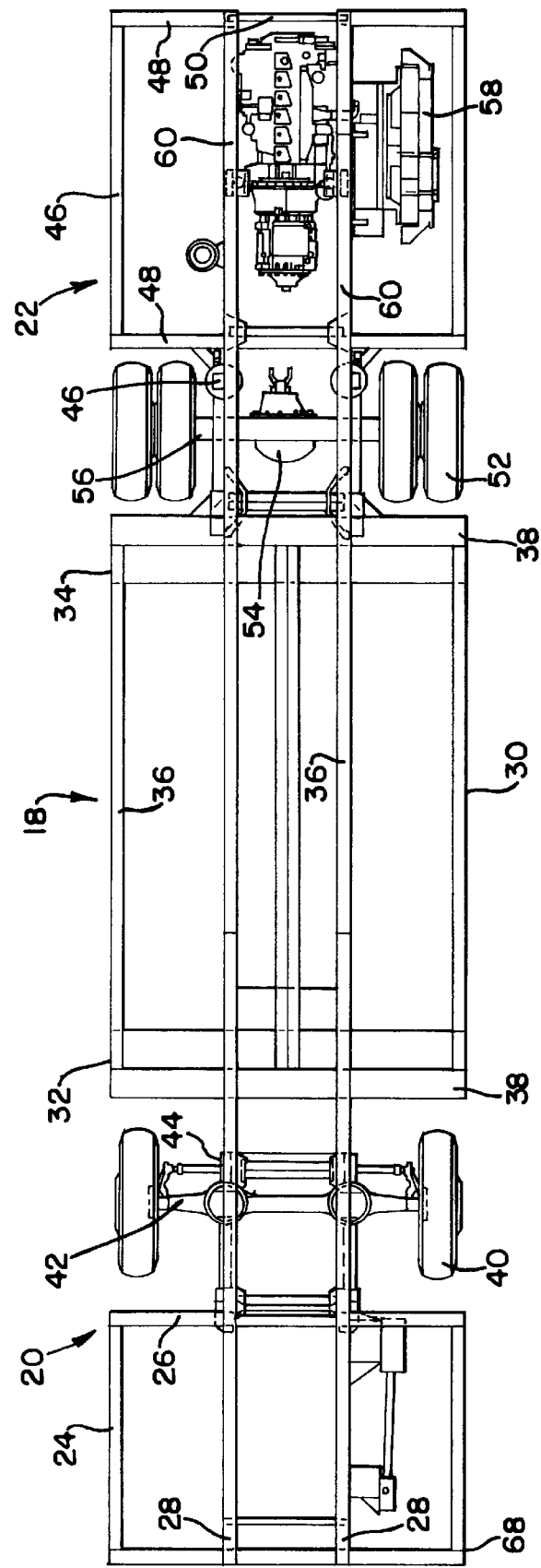
FIG. 1 depicts a top view of the device.

By way of disclosing a preferred embodiment, and not by way of limitation, there is shown in FIG. 1 a top view of a motor home chassis 18. Chassis 18 has three major components: a front chassis subcomponent 20, a rear chassis subcomponent 22, and a center floor rail system 30.

Front chassis component 20 further comprises at least two front floor rails 24 which run parallel to one another. The front floor rails are spaced apart from one another the width of the chassis 18. Additional floor rails may be inserted in between the two most outer floor rails 24 for purposes of adding additional strength to the final chassis 18. Perpendicular to the floor rails and at the outermost portion of the front chassis subcomponent are found rigidity tubes 26. The rigidity tubes, also known as cross-member outriggers, offer strength to the front chassis subcomponent and tie the subcomponents together. The front rigidity tubes and front floor rails are approximately three inches in height and are affixed to one another using typical means such as welding. Front rigidity tubes and floor rails are made of industry typical materials such as steel, aluminum, or composite materials.

Two frame rails 28 run longitudinally along the chassis beginning at a point equal to the front most portion of the front rigidity tube of the front chassis subcomponent to a point beyond the front wheels 40, front axle 42, and front suspension 44. The distance beyond which the frame rails run past these components is dictated by good engineering principles which, in turn, are governed by the length, gross vehicle weight and suspension requirements of a particular vehicle. Frame rails 28 are preferably made of steel approximately 5 inches in height. The frame rails 28 are spaced apart from one another at a distance governed by the engineering needs of the particular vehicle as noted above for length. The front chassis subcomponent floor rail/rigidity tube structure is affixed to the upper surface of the frame rails by means of fastening means, such as welding.

The rear chassis subcomponent 22 is designed much the same way as the front chassis subcomponent 20. Additional engineering considerations for the manufacture of the rear chassis subcomponent are dictated by the engine 58 which is housed on the rear of the chassis and the transmission 54 running to the engine 58 increasing the stress on the rear chassis subcomponent. In creating a rear chassis subcomponent such that the engine is most suitably mounted for safety and maintenance convenience, the rearward most rigidity tubes 48 do not extend the complete width of the rear chassis subcomponent 22. Instead, the rear rigidity tubes 48 extend approximately one-third of the width of the chassis 18. An engine mounting bracket 50 comprises the final middle third of the width of this unit.

The center floor rail system 30 comprises longitudinally running center floor rails 36. The center floor rail system typically has at least four floor rails for increased stability and safety. Factors such as vehicle length, gross vehicle weight, and suspension requirements may dictate that additional center floor rails be used.

At the outermost longitudinal ends of the center floor rails 36 are found center rigidity tubes 38. Mounted directly to the underneath surface of both the center rigidity tubes 38 and extending underneath the center floor rails 36 are a front steel plate 32 and a rear steel plate 34. Ideally, these steel plates are ⅜ inch thick by 17 inches wide. Their length is dictated by the width of the resulting chassis. Steel plates 32 and 34 provide additional strength and stability to the overall chassis unit, and further provide a mounting surface for front frame rails 28 and rear frame rails 60.

Figure 3:
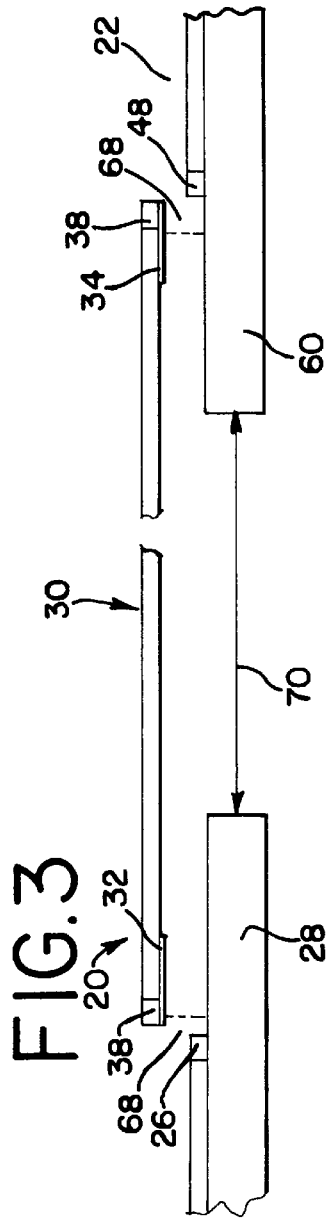
FIG. 3 depicts an expanded view of the front chassis subcomponent/center floor rail system junction.

Referring to FIG. 3, it is seen that assembly of the inventive device requires that the front chassis subcomponent 20 and the rear chassis subcomponent be spaced at a distance apart sufficient to accommodate the length requirements of the final chassis 18. A predetermined length and constructed center floor rail system 30 is placed over the top of the front frame rails 28 and rear frame rails 60 at spacing point 68 such that front center rigidity tube 38 is proximate front chassis subcomponent rigidity tube 26 and rear center rigidity tube 38 approximates rear chassis subcomponent rigidity tube 48 at spacing point 68. The front steel plate 32 and rear steel plate 34 are then affixed to front frame rail 28 and rear frame rail 60 at fastening point 66.

Figure 4:
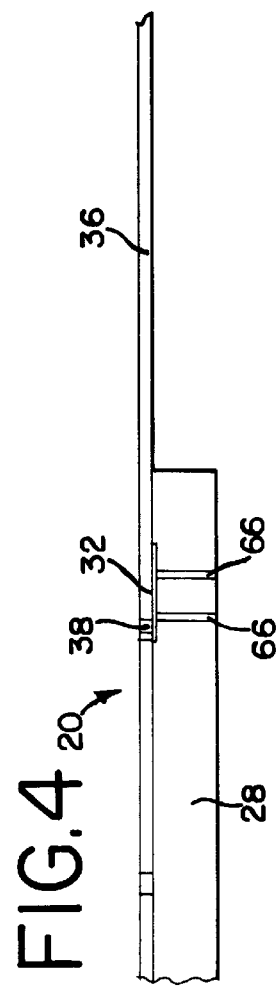
FIG. 4 depicts a close-up of front chassis subcomponent/center floor rail intersect.

FIG. 4 is a break-away view of front chassis subcomponent 20 affixed to center frame rail system 30.

Figure 2:
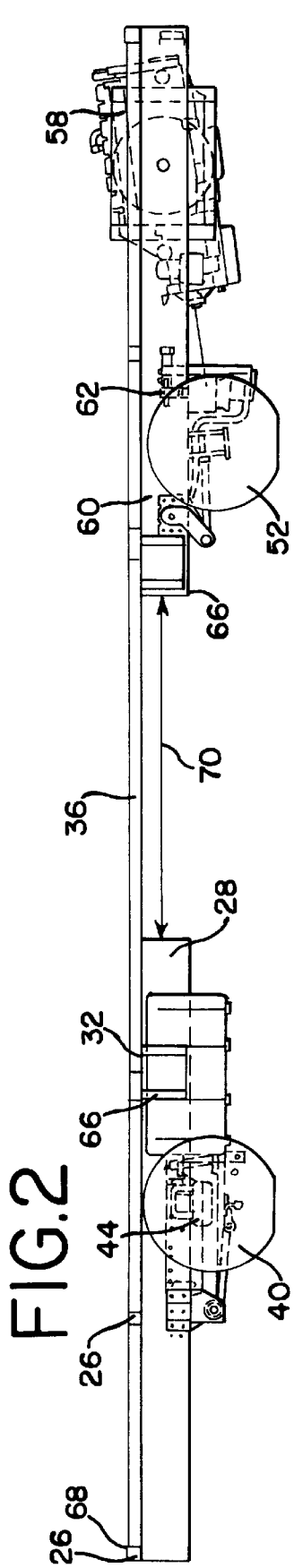
FIG. 2 depicts a side view of the device.

FIG. 2 depicts a side view of the inventive device illustrating that by attaching front chassis subcomponent 20 and rear chassis subcomponent 22 by means of center frame rail system 30, the superstructure, which is normally placed on top of a chassis, is now incorporated into a completed chassis 18. Use of this unique and novel system results in several advancements in the field: first, by incorporating the superstructure into the chassis itself, the center of gravity for the overall vehicle is lowered. A lowered center of gravity results in better handling and a smoother ride for the occupants. Second, by having a separate center floor rail system 30, as opposed to a fixed chassis length, flexibility is offered in wheelbase length; thus, custom manufacturing can be accomplished without costly chassis modifications.

Third, while lowering the center of gravity, the underbelly storage space of the finished vehicle is increased by approximately 5 inches without lowering ground clearance. This is accomplished through the innovative frame rail system of the front chassis subcomponent 20 and rear chassis subcomponent 22. By integrating the superstructure into the chassis, the frame rail system normally seen in a chassis need not extend the entire length of the vehicle. In the inventive device, the front frame rails 28 end at a point behind the front axle and suspension system while the rear frame rails 62 end at a point in front of the rear axle and suspension system, thereby creating a space 70 which is not found in a traditional chassis. Space 70 increases the underbelly storage capacity by approximately 5 inches without increasing vehicle height for the reason that this is the height of the front frame rails 28 and rear frame rails 60.

Fourth, the end product is less expensive to produce than the existing art since less material is used in the construction of the chassis and one entire manufacturing process (i.e. the manufacture and addition of a superstructure) is eliminated in the construction of the inventive device.

The above description is that of a preferred embodiment of the invention. Various alterations and changes can be made without departing from the spirit and broader aspects of the invention as set forth in the appended claims, which are to be interpreted in accordance with the principles of patent law, include the doctrine of equivalence. The embodiment of the invention in which exclusive property or privileges claimed are defined as follows:

We claim:

1. An integrated superstructure and chassis for motor homes and busses comprising:

Two front frame rails which extend longitudinally from the front of the chassis to a predetermined point beyond a front axle;

Two rear frame rails which extend longitudinally from the rear of the chassis to a predetermined point forward of a rear axle;

At least six cross-member outriggers which lay perpendicular to and affix on top of the front and rear frame rails at predetermined points, two of the said cross-member outriggers being laid across the front frame rails forward of the front axle, two of said cross-member outriggers laying across the rear frame rails rear of the rear axle, and one cross member outrigger being laid across the rear frame rails forward of the rear axle and one cross member outrigger rail being laid across the front frame rails rear of the axle with all cross-member outriggers being cut to a length equal to the width of the chassis;

At least six floor rails extending along the longitudinal axis of the chassis, two of said floor rails being placed and affixed between and at the outermost edges of the two said cross-member outriggers located across the front frame rails forward of the axle, two floor rails being placed and affixed between and at the outermost edges of the cross-member outriggers located across and affixed to the rear frame rails rear of the rear axle, and two floor rails being placed between and at outermost edges of the single cross-member outriggers located on the opposite side of the front and rear axles;

A steel plate extending the width of the chassis being placed at a predetermined point on the front frame rails to the rear of the front axle and located between the front frame rails and the floor rails and a second steel plate extending the width of the chassis placed at a predetermined point on the rear frame rails forward of the rear axle and located between the frame rails and floor rails, whereby an integrated superstructure and chassis is produced having a space created between the most rearward edge of the front frame rails and the most forward edge of the rear frame rails.

2. The integrated superstructure and chassis of claim 1 wherein the front and rear floor rails and front cross member outriggers are 5 inches in height.

3. The integrated superstructure and chassis of claim 1 wherein the front steel plate and rear steel plate of the center floor rail system are 17 inches wide.

4. The integrated superstructure and chassis of claim 1 wherein the front steel plate and rear steel plate of the center floor rail system are ⅜ of an inch thick.

5. An improved motor home and bus chassis comprising:

- A front chassis subcomponent being substantially rectangular in shape, having two front floor rails extending along the longitudinal axis of the chassis at the outer width of the chassis, two front cross member outriggers perpendicular to and affixed at the ends of the front floor rails, said front floor rail and cross member outrigger combination being affixed to at least two frame rails, which extend along the longitudinal axis of the chassis;
- A rear chassis subcomponent being substantially rectangular in shape, having two rear floor rails extending along the longitudinal axis of the chassis at the outer width of the chassis, two rear cross member outriggers perpendicular to and affixed at the ends of the rear floor rails, said rear floor rail and cross member outrigger combination being affixed to at least two rear frame rails, said rear frame rails extending along the longitudinal axis of the chassis;
- A center floor rail system being substantially rectangular in shape having at least two center floor rails extending along the longitudinal axis of the chassis at the outer width of the chassis, two center cross member outriggers perpendicular to and affixed at the ends of the center floor rails, and a front steel plate and a rear steel plate affixed perpendicularly in a planar orientation to and at the ends of the center floor rails;
- whereby the front chassis subcomponent and rear chassis subcomponent are aligned with one another and spaced sufficiently apart to accept the center floor rail system, said center floor rail system being affixed to the front chassis subcomponent frame rails at its front steel plate and to the rear chassis subcomponent frame rails at its rear steel plate.

6. The motor home and bus chassis of claim 5 wherein the front and rear floor rails and front cross member outriggers are 5 inches in height.

7. The motor home and bus chassis of claim 5 wherein the front steel plate and rear steel plate of the center floor rail system is 17 inches wide.

8. The motor home and bus chassis of claim 5 wherein the front steel plate and rear steel plate of the center floor rail system is ⅜ of an inch thick.

9. The motor home and bus chassis of claim 5 wherein the front frame rails of the front chassis subcomponent extend longitudinally rearwardly beyond the length of the floor rails.

10. The motor home and bus chassis of claim 5 wherein the frame rails of the rear chassis subcomponent extend longitudinally forwardly beyond the length of the rear floor rails.

* * * * *